US009188670B2

(12) United States Patent
Bruyere et al.

(10) Patent No.: US 9,188,670 B2
(45) Date of Patent: Nov. 17, 2015

(54) INTERFEROMETRIC INVERSE SYNTHETIC APERTURE RADAR AND METHOD

(71) Applicant: Raytheon Company, Waltham, MA (US)

(72) Inventors: Donald P. Bruyere, Tucson, AZ (US); Jeffrey Wadsworth, Tucson, AZ (US); William L. Chapman, Oro Valley, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 606 days.

(21) Appl. No.: 13/654,206

(22) Filed: Oct. 17, 2012

(65) Prior Publication Data
US 2015/0268340 A1 Sep. 24, 2015

(51) Int. Cl.
G01S 13/00 (2006.01)
G01S 13/90 (2006.01)
H01Q 21/06 (2006.01)

(52) U.S. Cl.
CPC .......... G01S 13/9023 (2013.01); H01Q 21/061 (2013.01); G01S 2013/9064 (2013.01)

(58) Field of Classification Search
CPC .................... G01S 13/9023; G01S 2013/9064; H01Q 21/061
USPC .......................................................... 342/123
See application file for complete search history.

(56) References Cited

U.S. PATENT DOCUMENTS 6,246,365 B1 6/2001 Tokoro
2003/0085833 A1 5/2003 Yu
2004/0227690 A1 11/2004 Rawnick et al.
2010/0085237 A1* 4/2010 Cornic et al. .................... 342/33
2012/0154203 A1 6/2012 Vacanti et al.

FOREIGN PATENT DOCUMENTS

EP 1 726 972 A1 11/2006

OTHER PUBLICATIONS

Liu, et al., "Review of Interferometric ISAR Imaging", Signal Processing, vol. 27, No. 5, May 25, 2011 (p. 737).
Ender, et al., "PAMIR—a wideband phased array SAR/MTI system", IEE Proceedings: Radar, Sonar & Navigation, Institution of Electrical Engineers, GB., vol. 150, No. 3, Jun. 2, 2003 (pp. 165-172).

(Continued)

Primary Examiner — Timothy A Brainard
(74) Attorney, Agent, or Firm — Christie, Parker & Hale, LLP

(57) ABSTRACT

An interferometric inverse synthetic aperture radar (IFISAR) is described that can provide a height measurement of moving objects on a surface using a small radar aperture. The IFISAR includes a two-dimensional antenna array including a plurality of elements that are configured to receive a plurality of return signals carrying energy of a transmitted RF signal that are reflected from the target. A first antenna group and a second antenna group of the plurality of elements respectively located at opposite ends of the array are enabled, and a third antenna group of the plurality of elements located between the first antenna group and the second antenna group are disabled. A processor of the IFISAR is operatively coupled to the plurality of elements and configured to determine height characteristics of the target according to interferometric processing of the return signals received by the first antenna group and the second antenna group.

20 Claims, 8 Drawing Sheets

(56) References Cited

OTHER PUBLICATIONS

Kostis, et al., "Interferometric Inverse Synthetic Aperture Radar", Proceedings of the London Communications Symposium 2005, Sep. 1, 2005 (4 pgs.).

Smith, et al., "A Synthetic Interferometric ISAR Technique for Developing 3-D Signatures", Aerospace Conference 2003, Proceedings, 2003 IEEE Mar. 8-15, 2003, Piscataway, NJ, IEEE, vol. 2, Mar. 8, 2003 (11 pgs.).

Felguera-Martin, et al., "Interferometric inverse synthetic aperture radar experiment using an interferometric linear frequency modulated continuous wave millimetre-wave radar", IET Radar, Sonar and Navigation, vol. 5, No. 1, Jan. 6, 2011, (pp. 39-47).

Given, et al., "Generalized ISAR—Part II: Interferometric Techniques for Three-Dimensional Location of Scatters", IEEE Transactions on Image Processing, IEEE Service Center, Piscataway, NJ, vol. 14, No. 11, Nov. 1, 2007 (pp. 1792-1797).

Bertl, et al., "Broadband circular interferometric millimetre-wave ISAR for threat detection", Advanced in Radio Science, vol. 5, Jan. 1, 2007 (pp. 147-151).

Written Opinion of the International Searching Authority for International Application No. PCT/US2013/055009, filed Aug. 14, 2013, Written Opinion of the International Searching Authority mailed Oct. 22, 2013 (9 pgs.).

International Search Report for International Application No. PCT/US2013/055009, filed Aug. 14, 2013, International Search Report dated Oct. 15, 2013 and mailed Oct. 22, 2013 (4 pgs.).

Written Opinion of the International Searching Authority for International Application No. PCT/US2014/046646, filed Jul. 15, 2014, Written Opinion of the International Searching Authority mailed Oct. 31, 2014 (6 pgs.).

International Search Report for International Application No. PCT/US2014/046646, filed Jul. 15, 2014, International Search Report dated Oct. 24, 2014 and mailed Oct. 31, 2014 (4 pgs.).

\* cited by examiner

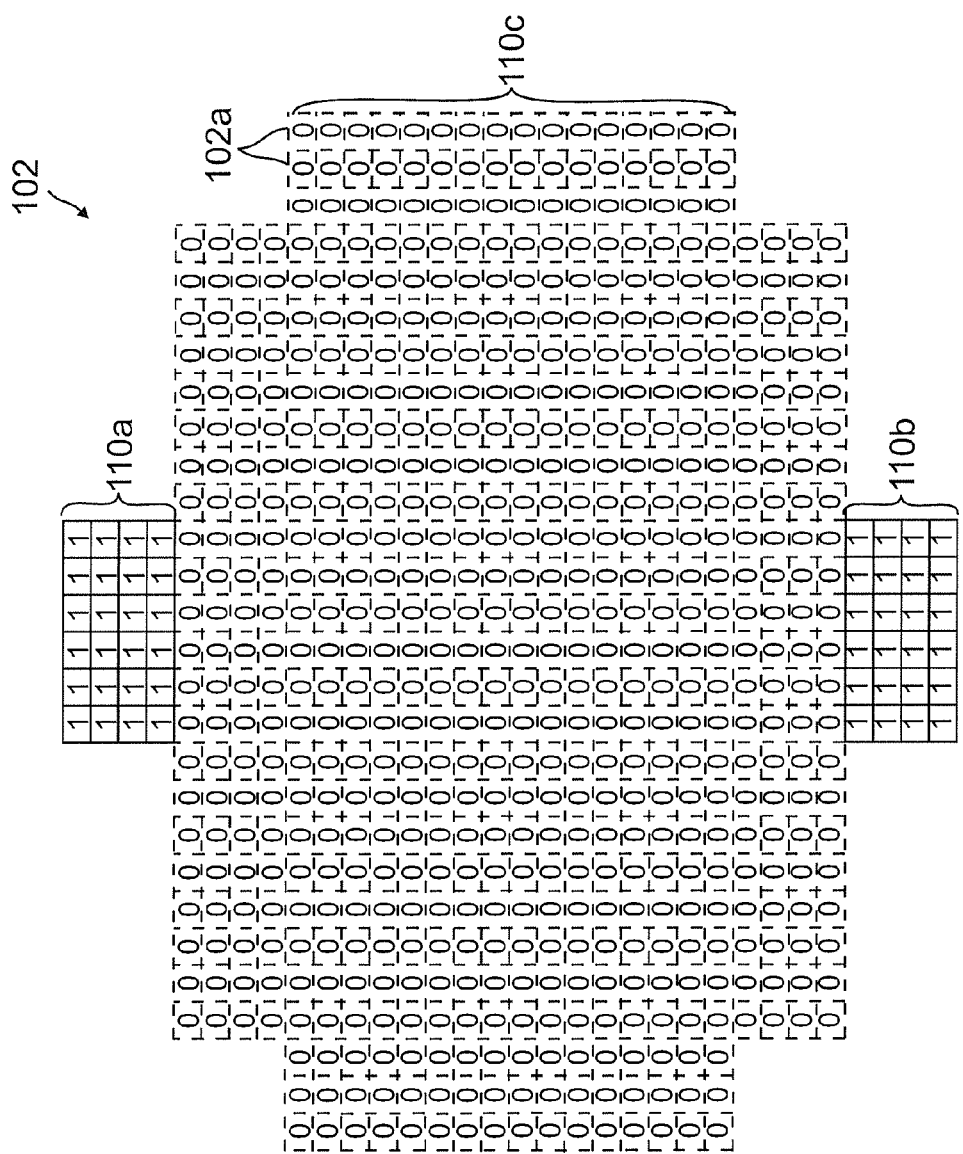

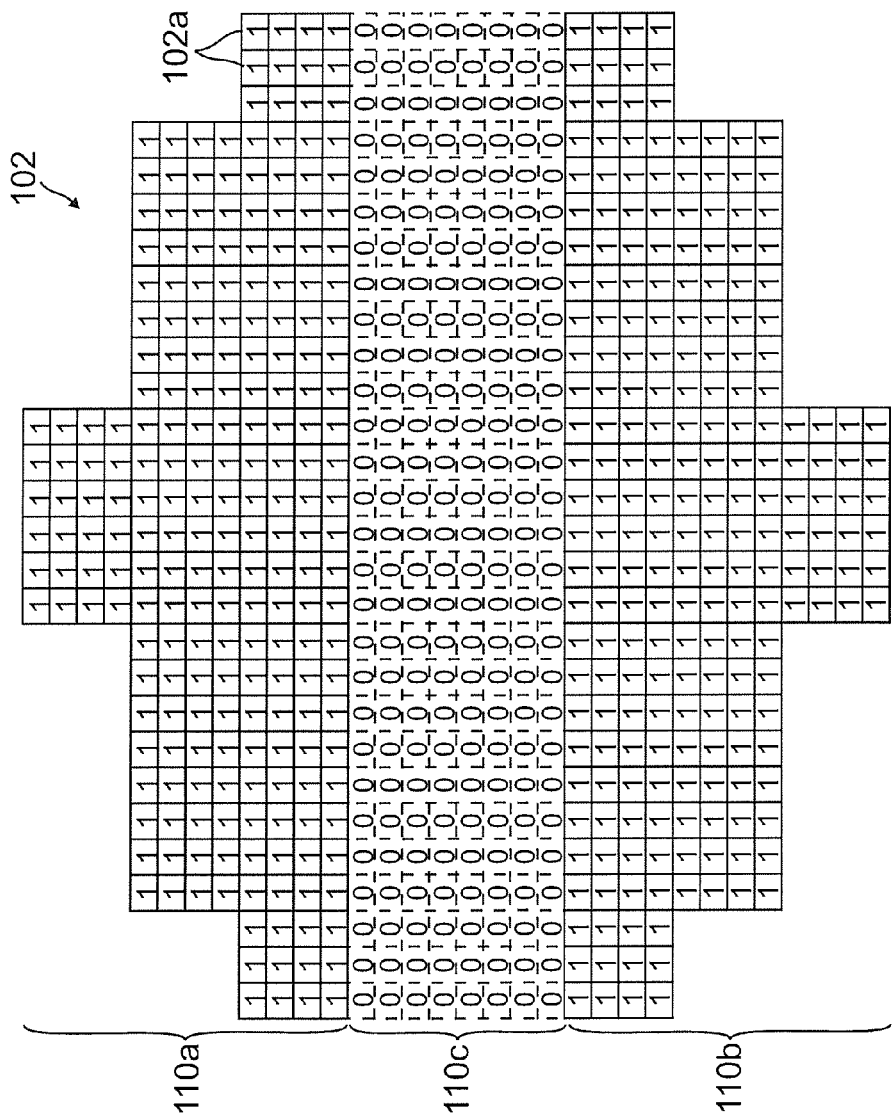

INTERFEROMETRIC INVERSE SYNTHETIC APERTURE RADAR AND METHOD

BACKGROUND

1. Field

Aspects of the present invention generally relate to synthetic aperture radars, and more particularly, to an interferometric inverse synthetic aperture radar.

2. Description of Related Art

A synthetic aperture radar (SAR) generates an image of a target by processing separate radar returns from a number of sequentially transmitted pulses from an antenna on a moving platform. The radar returns are combined and processed to generate imagery with quality comparable to that generated from a physically larger antenna. The SAR imagery is formed from the coherent combination of the amplitude and phase of the multiple radar returns within each range bin and are motion compensated for spatial displacement of the relative movement of the moving platform during the acquisition of the returns. Inverse synthetic aperture radar (ISAR) is similar but can be distinguished from SAR by also exploiting target movement in the image formation process.

SUMMARY

According to embodiments of the present invention, inverse synthetic aperture radar (ISAR) and interferometric processing techniques are combined to provide a height measurement of moving objects using a small airborne radar aperture. In particular, a split array design is utilized to provide a wider baseline distance in space constrained applications (e.g., missiles) where separate discrete antennas are not desirable. The embodiments can be useful in automatic target recognition (ATR) applications and other suitable applications. In addition, the embodiments can provide the height measurement in a single-pass of radar frame of data.

According to one embodiment of the present invention, an interferometric inverse synthetic aperture radar (IFISAR) includes: a two-dimensional antenna array including a plurality of antenna elements configured to: transmit a radio-frequency (RF) signal toward a target; and receive a plurality of return signals carrying energy of the transmitted RF signal that are reflected from the target, wherein a first antenna group and a second antenna group of the antenna elements respectively located at opposite ends of the array are enabled, and a third antenna group of the antenna elements located between the first antenna group and the second antenna group are disabled; and a processor operatively coupled to the plurality of antenna elements and configured to determine height characteristics of the target according to interferometric processing of the return signals received by the first antenna group and the second antenna group.

According to another embodiment of the present invention, a method is provided for operating an interferometric inverse synthetic aperture radar (IFISAR) including a two-dimensional antenna array. The method includes: configuring a plurality of antenna elements of the two-dimensional antenna array to transmit a radio-frequency (RF) signal toward a target; configuring the plurality of antenna elements in a split array mode with a first antenna group and a second antenna group of the antenna elements being enabled and a third antenna group of the antenna elements being disabled, the first antenna group and the second antenna group being respectively located at opposite ends of the two-dimensional antenna array, and the third antenna group being located between the first antenna group and the second antenna group; operating the first antenna group and the second antenna group to receive a plurality of return signals carrying energy of the transmitted RF signal that are reflected from the target; and determining height characteristics of the target according to interferometric processing of the return signals received by the first antenna group and the second antenna group.

In several embodiments, the processor may be configured to generate inverse synthetic aperture radar (ISAR) images of the target; identify pixels of the ISAR images having a signal-to-noise ratio higher than a predetermined threshold value (e.g., between about 7 dB and about 10 dB); measure a phase difference between the ISAR images generated by the first antenna group and the second antenna group, respectively, for the identified pixels; and estimate a height of the target using the measured phase difference of the identified pixels.

BRIEF DESCRIPTION OF THE DRAWINGS

The above and other features and aspects of the present invention will become more apparent by describing in detail embodiments thereof with reference to the attached drawings in which:

FIGS. 4a through 4c are drawings respectively illustrating the phased array antenna of FIG. 3 configured in different split array modes according to several embodiments of the present invention.

DETAILED DESCRIPTION

Among the many synthetic aperture radar (SAR) variations, an interferometric synthetic aperture radar (IFSAR) uses two or more synthetic aperture radar (SAR) images to generate images of a scene using differences (e.g., phase differences) and other attributes of the radar returns respectively received by two or more antennas. Because the radar returns originate from a single source, phase information of the radar returns can be analyzed to determine height features within the scene. The operations of the SAR and IFSAR are generally known to one skilled in the art. Therefore, detailed description of SAR and interferometric SAR will not be repeated herein.

An inverse synthetic aperture radar (ISAR) generally utilizes the movement of the target rather than the emitter to create the image. Alternatively, an ISAR can operate by moving (e.g., rotating) a radar beam and returns across a target of interest, thereby exploiting both platform and target motions to form the image. The ISAR can be particularly useful in maritime surveillance applications. In these applications, a surface ship (i.e., target) has a motion due to wave action, and a feature of the ship that extends far over the surface such as a mast will provide a significant sinusoidal response which can be identifiable in a two dimensional image. The ISAR can form an image of the target in two dimensions (e.g., down range and cross range). The operations of the ISAR are generally known to one skilled in the art. Therefore, detailed description of ISAR will not be repeated herein.

Embodiments of the present invention combine features of ISAR and IFSAR to provide an interferometric inverse synthetic aperture radar (IFISAR) and a method for operating the IFISAR that can provide a three-dimensional image of a moving target. In these embodiments, the addition of interferometric processing expands the two-dimensional image obtained by ISAR to a three-dimensional image. According to these embodiments, the height of the moving target on the surface can be measured using a small airborne radar aperture in a single-pass radar frame of data. According to the embodiments, combined yaws from platform and target motion provide a plan view (e.g., two-dimensional view) of the target while a phase difference from two antennas is used interferometrically to provide height information for a third dimension.

Figure 1:
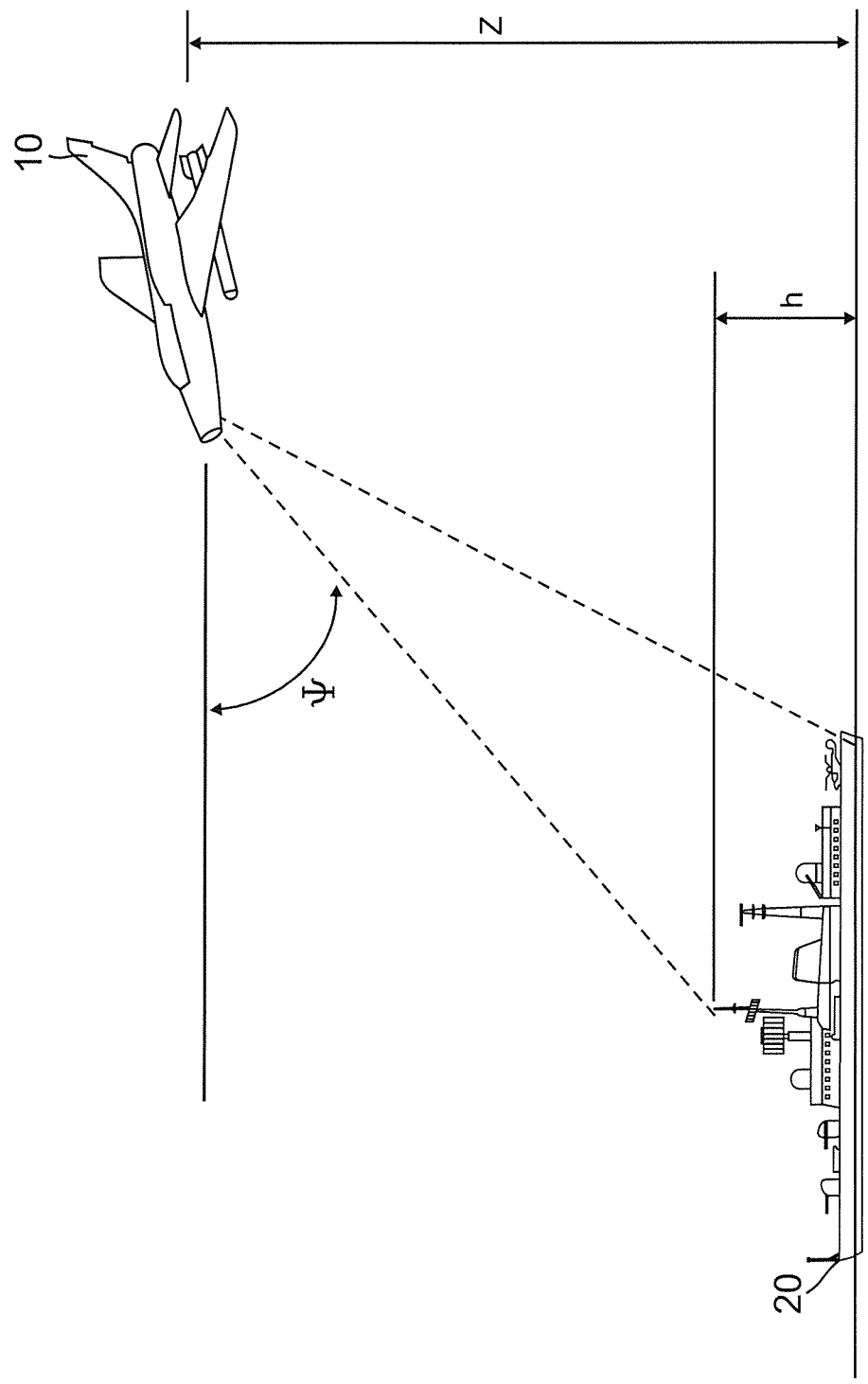
FIG. 1 is a drawing conceptually illustrating a moving radar platform configured to acquire imagery of a target using an interferometric inverse synthetic aperture radar (IFISAR)

FIG. 1 is a drawing conceptually illustrating a moving radar platform 10 configured to acquire imagery of a target 20 using an IFISAR. In several embodiments, the moving platform 10 is an airborne platform carrying suitable radar equipments (e.g., apertures, emitters, computer systems for signal processing, etc.) for providing height measurement of the target 20, which may be a surface ship. In order to perform interferometric measurements, the platform 10 is equipped with two antennas that are spaced apart in the height direction (e.g., vertical direction) of the target 20. However, the present invention is not limited thereto. More antennas may be used in other embodiments. The platform 10 emits a radar beam at a suitable frequency (e.g., X band or 2 GHz to 110 GHz), and the radar beam is reflected by the target 20 into a number of return signals each carrying a portion of the energy of the radar beam. The vertical spatial separation of the antennas of the platform 10 provides differences (e.g., phase differences) between the return signals received by the two antennas, respectively, that may be used to measure the height and other vertical characteristics of the target 20. In several embodiments, the platform 10 may operate in S, C, X, Ku, K, Ka, or W bands.

Referring to FIG. 1, the height (h) of the target 20 can be determined by the following equation (1).

$$h = \left[\frac{\lambda Z \cot(\Psi)}{4\pi B \cos(\Psi)}\right] \Delta\phi \quad (1)$$

In equation (1), h is the height of the target 20, λ is the wavelength of the radar's transmitted pulse, Z is the altitude of the platform 10, B is the baseline distance between the split array's phase center, Ψ is the depression or look-down angle to the target, and Δφ is the measured phase difference between the return signals.

Figure 2:
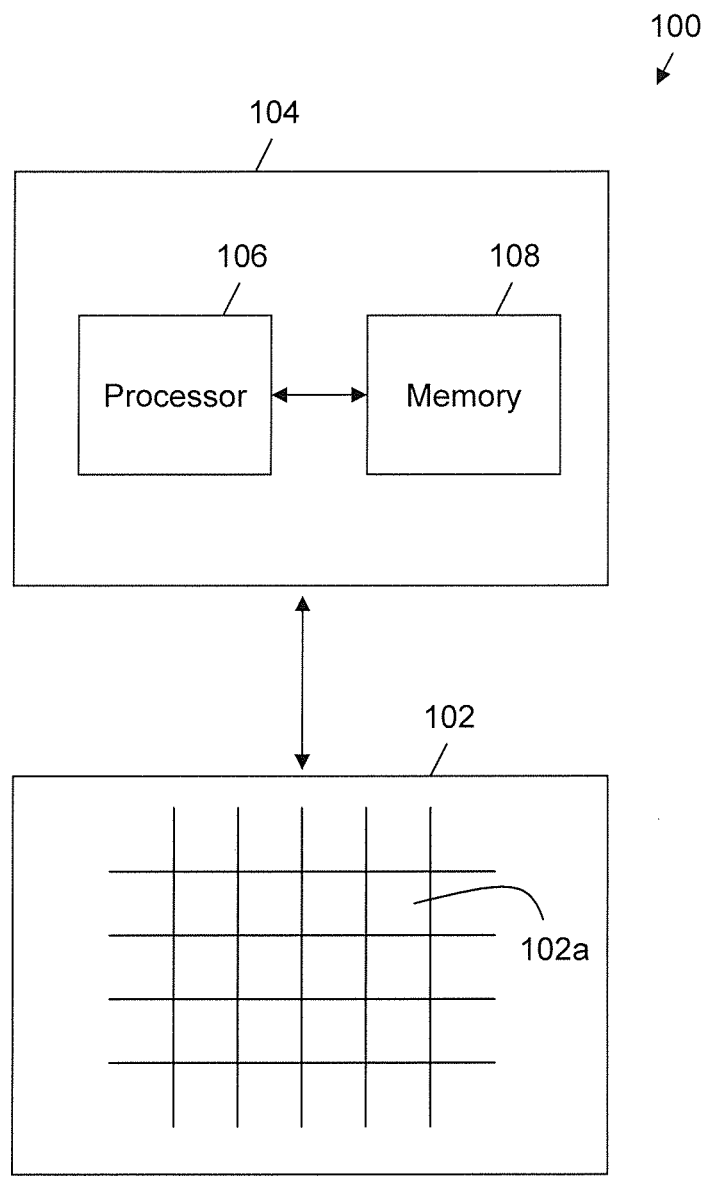
FIG. 2. is a block diagram of an IFISAR according to an embodiment of the present invention.

FIG. 2. is a block diagram conceptually illustrating an interferometric inverse synthetic aperture radar (IFISAR) 100 according to an embodiment of the present invention. The IFISAR 100 includes a phased array antenna 102 including multiple elements (or antennas) operatively coupled to a computer system 104. In several embodiments, the phased array antenna 102 is an active electronically scanned array. The computer system 104 includes a processor 106 and a memory 108 for operating an image processing application that processes the radar returns to derive various vertical characteristics (e.g., height) of the target 20 (see FIG. 1). One skilled in the art will appreciate that the present invention is not limited to the embodiment of FIG. 2, and the IFISAR 100 may have other configuration according to various embodiments. The computer 104 may be a stand-alone computing system or a networked computer system capable of executing the image processing application.

The phased array antenna 102 includes a number of radiating elements 102a each with a phase shifter. Radar beams are formed by shifting the phase of the signal emitted from each radiating elements 102a, to provide constructive/destructive interference so as to steer the beams in the desired direction. In one embodiment, the computer system 104 generates inverse synthetic aperture radar (ISAR) images of the target 20 based on returned radar signals, and identifies pixels of the ISAR images having a signal-to-noise ratio (SNR) higher than a predetermined threshold value (e.g., between about 7 dB and about 10 dB, inclusive). In several embodiments, a SNR between about 7 dB and about 10 dB can provide adequate signal for height measurement. A phase difference between the ISAR images generated by the first antenna group and the second antenna group, respectively, is measured for the identified pixels. Accordingly, a height of the target can be estimated using the measured phase difference of the identified high SNR pixels and equation (1).

Figure 3:
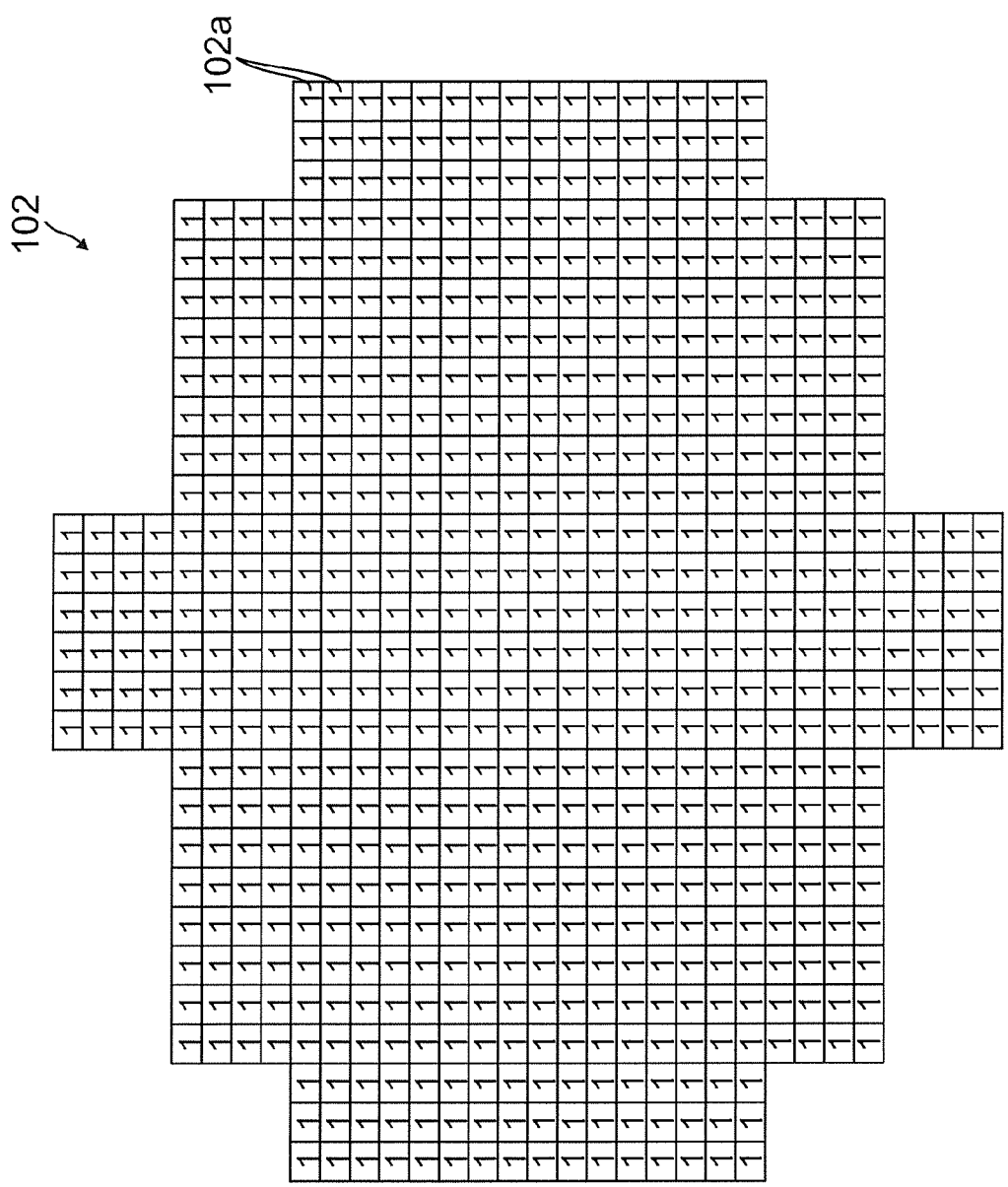
FIG. 3 is a drawing illustrating a configuration of a phased array antenna for transmitting a radar beam according to an embodiment of the present invention.

FIG. 3 is a drawing illustrating a configuration of the phased array antenna 102 for transmitting a radar beam according to an embodiment of the present invention. In FIG. 3, all of the elements 102a are turned on to transmit one or more radar beams toward the target 20. Then, the phased array antenna 102 receives a number of return signals from the target 20. The return signals are interferometrically processed by the image processing application running at the computer system 104 so that the height of the target 20 can be determined for each image pixel associated with the target based on equation (1).

Figure 4B:
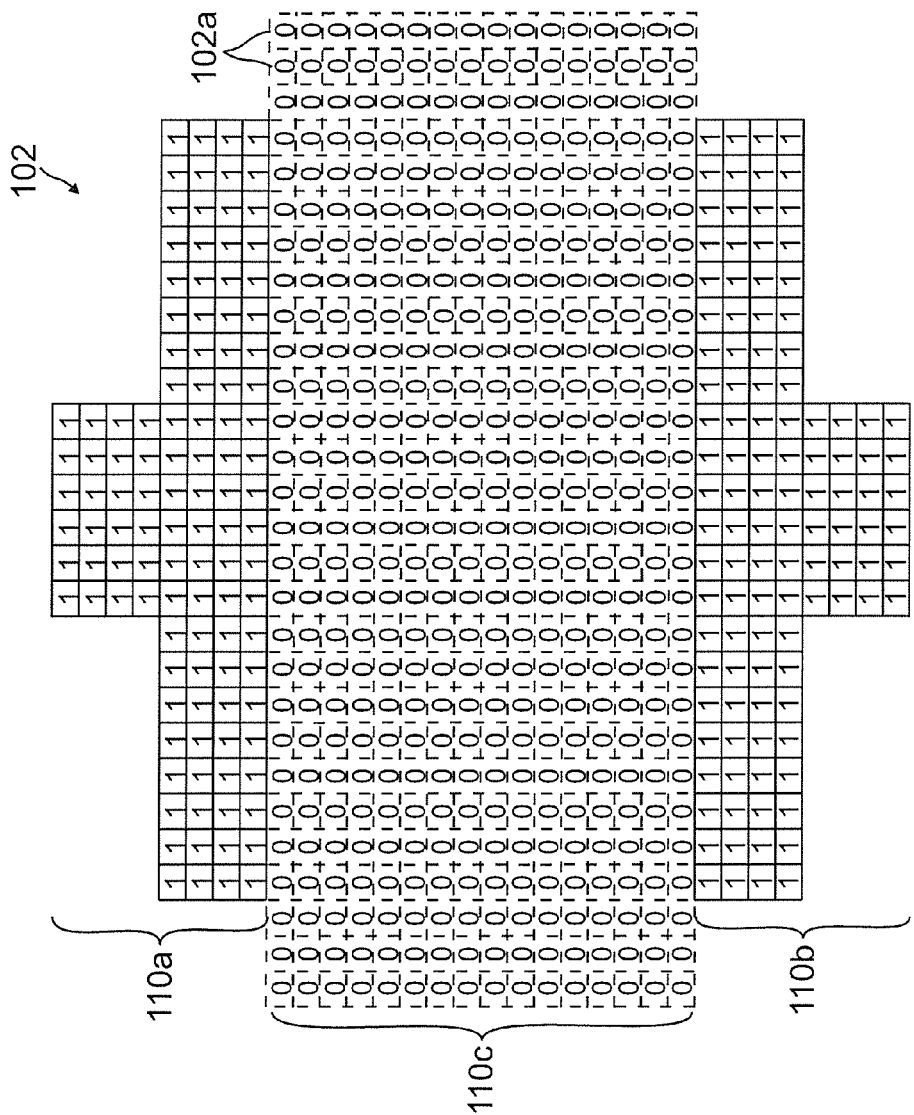

FIGS. 4a through 4c are drawings respectively illustrating the phased array antenna 102 configured in different split array modes according to several embodiments of the present invention. In each of the embodiments of FIGS. 4a-4c, the elements 102a of the phased array antenna 102 at the upper section 110a and the lower section 110b of the antenna are enabled while the elements 102a in the middle section 110c are disabled. In FIG. 4a, the phase center distance (i.e., baseline distance) between the upper section 110a and the lower section is about 150 mm. In FIG. 4b, the phase center distance (i.e., baseline) between the upper section 110a and the lower section 110b is less than about 140 mm. In FIG. 4c, the phase center distance (i.e., baseline) between the upper section 110a and the lower section 110b is less than about 100 mm. In one embodiment, the phase center distance (i.e., baseline) between the upper section 110a and the lower section 110b is about 20 mm. In several embodiments, the spacing between two adjacent elements 102a is about X mm. However, the present invention is not limited to the embodiments of FIGS. 4a-4c. To the contrary, the phased array antenna 102 may be configured in other suitable split array configurations in order to function effectively as two separate antennas to acquire interferometric data.

Figure 5:
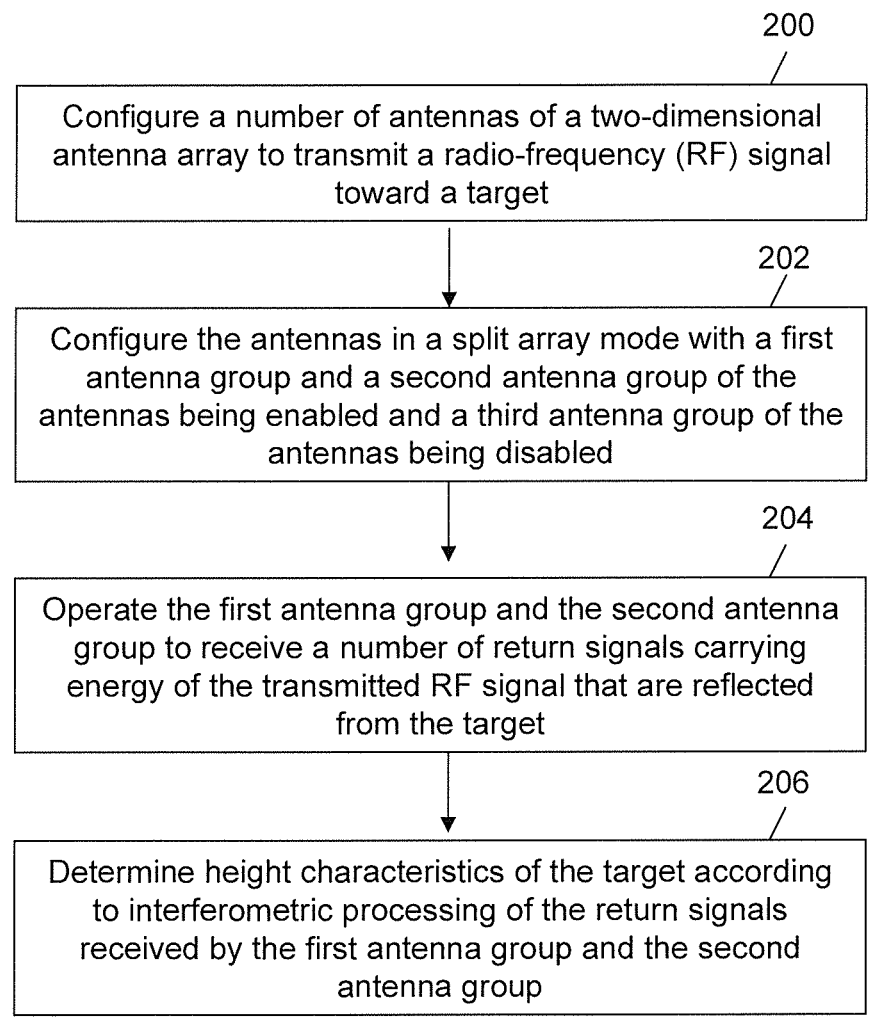
FIG. 5 is a flowchart illustrating a method for operating an IFISAR to measure the height of a target by interferometric processing using a two-dimensional array according to an embodiment of the present invention.

FIG. 5 is a flowchart illustrating a method for operating an IFISAR to measure the height of a target by interferometric processing using a two-dimensional array according to an embodiment of the present invention. In act 200, a number of antenna elements (or apertures) of the two-dimensional antenna array (e.g., a phased array antenna) are configured such that a radio-frequency (RF) signal (e.g., radar beam) is transmitted toward a target. In several embodiments, all or some of the antenna elements may be enabled to transmit the RF signal. In act 202, the antenna elements are configured in a split array mode with a first antenna group and a second antenna group of the antenna elements being enabled and a third antenna group of the antenna elements being disabled. Here, the first antenna group and the second antenna group are respectively located at opposite ends of the antenna array, and the third antenna group of the antenna elements being located between the first antenna group and the second antenna group. In act 204, the first antenna group and second antenna group of the antenna elements are operated in the split array mode to receive a number of return signals carrying energy of the transmitted RF signal that are reflected from the target. In act 206, height characteristics of the target are determined according to interferometric processing of the return signals received by the first antenna group and the second antenna group.

Figure 6:
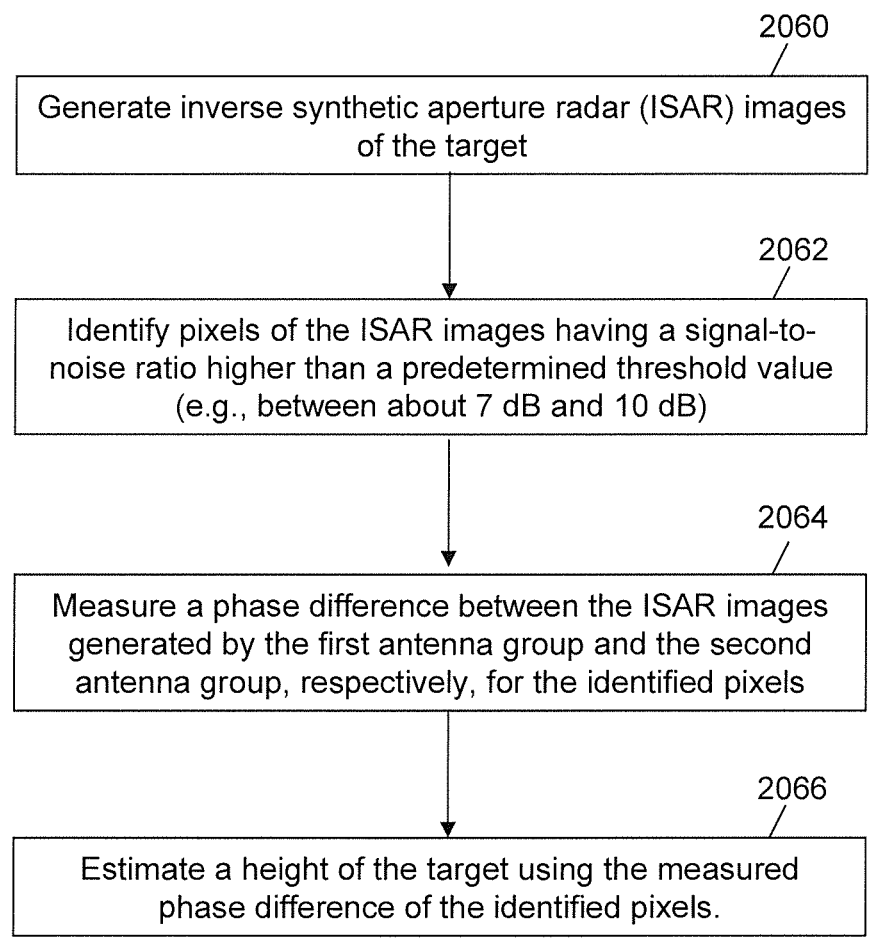
FIG. 6 is a flowchart illustrating the act of FIG. 5 in more detail according to one embodiment.

FIG. 6 is a flowchart illustrating the act 206 of FIG. 5 in more detail according to one embodiment. In act 2060, ISAR images of the target are generated using the first antenna group and the second antenna group. In act 2062, pixels of the ISAR images having a signal-to-noise ratio higher than a predetermined threshold value is identified. In act 2064, a phase difference between the ISAR images generated by the first antenna group and the second antenna group, respectively, is measured for the identified pixels. In 2066, a height of the target is estimated using the measured phase difference of the identified pixels according to equation (1) above.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

In one embodiment of the described split array mode, the enabled antenna elements are configured to couple the return signals to an image processing application, while the disabled antenna elements are configured not to couple the return signals to the image processing application. In several embodiments, the image processing application may be configured to ignore the return signals coupled from the disabled antenna elements. In other embodiments, all the antenna elements may be enabled to couple the return signals to the image processing application that is configured to ignore the return signals from some of the antenna elements generally located in the middle portion of the array.

While the present invention has been particularly shown and described with reference to various embodiments, it will be understood by those of ordinary skill in the art that various changes in form and details may be made therein without departing from the spirit and scope of the present invention as defined by the following claims and their equivalents.

What is claimed is:

1. An interferometric inverse synthetic aperture radar (IF-ISAR) comprising:
a two-dimensional antenna array comprising a plurality of elements configured to:
transmit a radio-frequency (RF) signal toward a target; and
receive a plurality of return signals carrying energy of the transmitted RF signal that are reflected from the target, wherein a first antenna group and a second antenna group of the plurality of elements respectively located at opposite ends of the array are enabled, and a third antenna group of the plurality of elements located between the first antenna group and the second antenna group are disabled; and
a processor operatively coupled to the plurality of elements and configured to determine height characteristics of the target according to interferometric processing of the return signals received by the first antenna group and the second antenna group.

2. The IFISAR of claim 1, wherein the processor is configured to:
generate inverse synthetic aperture radar (ISAR) images of the target;
identify pixels of the ISAR images having a signal-to-noise ratio higher than a predetermined threshold value;
measure a phase difference between the ISAR images generated by the first antenna group and the second antenna group, respectively, for the identified pixels; and
estimate a height of the target using the measured phase difference of the identified pixels.

3. The IFISAR of claim 2, wherein the processor is configured to estimate the height of the target according to the equation:

$$h = \left[\frac{\lambda Z \cot(\Psi)}{4\pi B \cos(\Psi)}\right] \Delta\phi$$

wherein h is the height of the target, λ is a wavelength of the transmitted RF signal, Z is an altitude of the two-dimensional antenna array, B is a baseline distance between the first antenna group and the second antenna group, Ψ is a depression or look-down angle to the target, and Δφ is the measured phase difference.

4. The IFISAR of claim 1, wherein the two-dimensional antenna array is configured to transmit the RF signal using substantially all of the plurality of elements.

5. The IFISAR of claim 1, wherein the IFISAR is configured to generate the height characteristics of the target in a single-pass radar frame of data.

6. The IFISAR of claim 1, wherein the two-dimensional antenna array is an active electronically scanned array.

7. The IFISAR of claim 1, wherein the radio-frequency (RF) signal has a frequency between about 2 GHz and about 110 GHz.

8. The IFISAR of claim 1, wherein a baseline distance between the first antenna group and the second antenna group is about 150 mm or less.

9. The IFISAR of claim 8, wherein a baseline distance between the first antenna group and the second antenna group is about 20 mm.

10. The IFISAR of claim 1, wherein the first antenna group and the second antenna group are spaced apart in a height direction of the target.

11. A method for operating an interferometric inverse synthetic aperture radar (IFISAR) comprising a two-dimensional antenna array, the method comprising:
configuring a plurality of elements of the two-dimensional antenna array to transmit a radio-frequency (RF) signal toward a target;
configuring the plurality of elements in a split array mode with a first antenna group and a second antenna group of the plurality of elements being enabled and a third antenna group of the plurality of elements being disabled, the first antenna group and the second antenna group being respectively located at opposite ends of the two-dimensional antenna array, and the third antenna group being located between the first antenna group and the second antenna group;
operating the first antenna group and the second antenna group to receive a plurality of return signals carrying energy of the transmitted RF signal that are reflected from the target; and determining height characteristics of the target according to interferometric processing of the return signals received by the first antenna group and the second antenna group.

12. The method of claim 11, wherein the determining height characteristics of the target comprises:
generating inverse synthetic aperture radar (ISAR) images of the target;
identifying pixels of the ISAR images having a signal-to-noise ratio (SNR) higher than a predetermined threshold value;
measuring a phase difference between the ISAR images generated by the first antenna group and the second antenna group, respectively, for the identified pixels; and
estimating a height of the target using the measured phase difference of the identified pixels.

13. The method of claim 12, wherein the height of the target is estimated according to the equation:

$$h = \left[\frac{\lambda Z \cot(\Psi)}{4\pi B \cos(\Psi)}\right]\Delta\phi$$

wherein h is the height of the target, $\lambda$ is a wavelength of the transmitted RF signal, Z is an altitude of the two-dimensional antenna array, B is a baseline distance between the first antenna group and the second antenna group, $\Psi$ is a depression or look-down angle to the target, and $\Delta\phi$ is the measured phase difference.

14. The method of claim 11, wherein the RF signal is transmitted using substantially all of the plurality of elements.

15. The method of claim 11, wherein the height characteristics of the target is generated in a single-pass radar frame of data.

16. The method of claim 11, wherein the two-dimensional antenna array is an active electronically scanned array.

17. The method of claim 11, wherein the radio-frequency (RF) signal has a frequency between about 2 GHz and about 110 GHz.

18. The method of claim 11, wherein a baseline distance between the first antenna group and the second antenna group is about 150 mm or less.

19. The method of claim 18, wherein a baseline distance between the first antenna group and the second antenna group is about 20 mm.

20. The method of claim 11, wherein the first antenna group and the second antenna group are spaced apart in a height direction of the target.

* * * * *